(12) United States Patent
Ko et al.

(10) Patent No.: US 12,104,807 B2
(45) Date of Patent: Oct. 1, 2024

(54) RADON MANAGEMENT SYSTEM USING RADON DETECTOR

(71) Applicant: FTLAB CO., LTD., Ansan-si (KR)

(72) Inventors: Jae Jun Ko, Seoul (KR); Young Gweon Kim, Anyang-si (KR)

(73) Assignee: FTLAB CO., LTD., Ansan-si (KR)

(*) Notice: Subject to any disclaimer, the term of this patent is extended or adjusted under 35 U.S.C. 154(b) by 551 days.

(21) Appl. No.: 17/310,034

(22) PCT Filed: Sep. 21, 2020

(86) PCT No.: PCT/KR2020/012685
§ 371 (c)(1),
(2) Date: Jul. 13, 2021

(87) PCT Pub. No.: WO2021/085857
PCT Pub. Date: May 6, 2021

(65) Prior Publication Data
US 2022/0099321 A1    Mar. 31, 2022

(30) Foreign Application Priority Data

Oct. 28, 2019    (KR) .......................... 10-2019-0134645

(51) Int. Cl.
*F24F 11/00*    (2018.01)
*G01T 1/167*    (2006.01)
(Continued)

(52) U.S. Cl.
CPC .......... *F24F 11/0001* (2013.01); *G01T 1/167* (2013.01); *G05B 19/042* (2013.01); *F24F 2110/68* (2018.01); *G05B 2219/2614* (2013.01)

(58) Field of Classification Search
CPC .............. F24F 11/0001; F24F 2110/68; G05B 2219/2614; Y02B 30/70; G01T 1/178; G01T 7/00
See application file for complete search history.

(56) References Cited

U.S. PATENT DOCUMENTS 3,988,587 A * 10/1976 Shreve, Jr. .............. G01T 1/178
250/DIG. 2
2020/0378938 A1* 12/2020 Lee ........................ G01V 5/271

FOREIGN PATENT DOCUMENTS

KR    10-1446285 B1    10/2014
KR    10-1569270 B1    11/2015
(Continued)

OTHER PUBLICATIONS

English translation of International Search Report for International application No. PCT/KR2020/012685, Jan. 8, 2021, ISA/KR (Year: 2021).*

(Continued)

*Primary Examiner* — Mi'schita' Henson
(74) *Attorney, Agent, or Firm* — ArentFox Schiff LLP (57) ABSTRACT

A radon management system using a radon detector is proposed. The system includes: at least one radon detector installed in a specific space indoors or outdoors, and configured to detect in real time alpha particles present in the specific space, output a predetermined alpha particle detection signal, count for a preset measurement time to calculate and transmit an alpha particle concentration value, and transmit unique device identification information; and a radon management server configured to collect the unique device identification information and alpha particle concentration value, calculate and quantify an average value of the collected alpha particle concentration values to be converted into a database for each radon detector, store and manage the average value, compare the alpha particle concentration value and the average values of the previously stored alpha particle concentration value to each other to calculate a change amount thereof, and generate radon generation event information data.

18 Claims, 2 Drawing Sheets

(51) Int. Cl.
      *G05B 19/042*     (2006.01)
      *F24F 110/68*     (2018.01)

(56) References Cited

FOREIGN PATENT DOCUMENTS

| KR | 10-1650436 B1 | 8/2016 | | |
|---|---|---|---|---|
| KR | 10-2017-0023601 A | 3/2017 | | |
| KR | 10-1912680 B1 | 10/2018 | | |
| KR | 10-1922211 B1 | 11/2018 | | |
| KR | 102239524 B1 * | 4/2021 | ............. | G01T 1/167 |

OTHER PUBLICATIONS

English translation of EPO Search Opinion for Application No. EP 20881549.8 (Year: 2022).*
English machine translation of Foreign Patent Document KR10-1912680 B1 to Lee (Year: 2018).*
English machine translation of Foreign Patent Document KR10-1446285 to Joo et al. (Year: 2014).*
English machine translation of Abstract for Foreign Patent Document KR102239524 to Ko Jae Jun et al. (Year: 2021).*
International Search Report for International application No. PCT/KR2020/012685, Jan. 8, 2021, ISA/KR.

* cited by examiner

RADON MANAGEMENT SYSTEM USING RADON DETECTOR

CROSS-REFERENCE TO RELATED APPLICATION

This application is a 371 U.S. national stage of PCT/KR2020/012685, filed Sep. 21, 2020 which claims the benefit of Korean Patent Application No. 10-2019-0134645, filed Oct. 28, 2019, the contents of each of which are incorporated herein by reference.

TECHNICAL FIELD

The present invention relates to a radon management system using a radon detector.

BACKGROUND ART

In general, radon (Rn) is a kind of radioactive gas that has an alpha decay with a half-life of 3.8 days, and is colorless, odorless, and inert. Radon mainly enters a room through cracks in a building from the ground of a floor of the building, and is also generated from decay of uranium contained in cement and soil used in building construction, and other interior and exterior materials, thereby entering the room.

When such radon enters the lungs through the respiratory organs, the radon kills the cells in the lungs and causes cancer, so the World Health Organization (WHO) and the U.S. Environmental Protection Agency (USEPA) define radon as the second major causative agent of lung cancer after smoking and recommend controlling radon concentration in indoor air. Radon is present in outdoor air or groundwater, but indoor air accounts for about 95% of exposure.

That is, since radon is the heaviest gas on Earth, once radon enters a room, radon is not well discharged, but accumulates in the room, and through human breathing, radon enters the lungs and disintegrates in the lungs, thereby releasing alpha radiation. The alpha radiation consists of the nucleus of helium (He2+) and has weaker penetration power than that of beta or gamma radiation, but the relatively large mass of radon causes destruction of the lung cells.

Meanwhile, in order to reduce radon gas entering a room, periodic ventilation is required mainly by a resident, but during cold winter or at night, the room is not properly ventilated, so the resident is exposed to radon gas, thereby being vulnerable to being seriously harmed.

In particular, in the case of classrooms where students live in groups, there is no systematic management against radon gas exposure, so the health of students is a concern. In order to solve such a problem, by means of an amendment to the School Health Act, the government mandates that a facility measures and reduces radon gas so that radon gas must be kept below the level of 148 $Bq/m^3$ in each classroom of the first floor or lower.

DISCLOSURE

Technical Problem

The present invention is devised to solve the above-described problems, and an objective of the present invention is to provide a radon management system using a radon detector, in which radon concentration of a specific space indoors and/or outdoors is obtained, in real time and/or periodically, by using at least one radon detector installed in the corresponding specific space, radon concentration data for each radon detector is converted into a database (DB) to be stored and managed therein by using a radon management server connected to each radon detector through a communication network, and cloud computing services are provided in response to a request from an external terminal, thereby enabling efficient management of radon concentration data of each radon detector installed in the specific space indoors and/or outdoors.

Technical Solution

In order to achieve the above-described objective, an aspect of the present invention is to provide a radon management system using a radon detector, the radon management system including: at least one of radon detectors installed in a specific space indoors or outdoors, and configured to detect in real time alpha particles present in the specific space, output a predetermined alpha particle detection signal, count for a measurement time preset based on the output alpha particle detection signal to calculate an alpha particle concentration value, and transmit unique device identification information together with the calculated alpha particle concentration value; and a radon management server configured to collect the unique device identification information together with the alpha particle concentration value transmitted from each radon detector during a preset measurement period, calculate and quantify an average value of the collected alpha particle concentration values, convert the average value into a database (DB) for each radon detector, store and manage the average value, compare the alpha particle concentration value transmitted in real time from each radon detector and the average value of the previously stored alpha particle concentration values with each other, calculate an amount of change in the alpha particle concentration value, and generate radon generation event information data according to the amount of change in the calculated alpha particle concentration value.

Here, the radon management server may generate the radon generation event information data when the calculated amount of change in the alpha particle concentration value is greater than a preset reference amount of change.

Preferably, the radon management server may transmit the generated radon generation event information data to at least one external terminal through a communication network.

Preferably, the radon management server may convert user action mission information corresponding to the amount of change in the calculated alpha particle concentration value into the database (DB) for each amount of change in each alpha particle concentration value, store and manage the user action mission information in a separate storage device, extract the amount of change in the alpha particle concentration value at a time of generating the radon generation event information data, read, from the storage device, the user action mission information corresponding to the amount of change in the extracted alpha particle concentration value, use the read user action mission information, and generate the radon generation event information data.

Preferably, the user action mission information may include information of action mission contents and action mission execution time so as to reduce the amount of change in the alpha particle concentration value.

Preferably, when collecting the alpha particle concentration value transmitted from each radon detector during the preset measurement period, the radon management server may determine the alpha particle concentration value transmitted from each radon detector as noise in a case where the alpha particle concentration value is greater than a preset maximum alpha particle concentration value or less than a preset minimum alpha particle concentration value, use only the alpha particle concentration value excluding the alpha particle concentration value determined as the noise among the collected alpha particle concentration values, and calculate the average value of the alpha particle concentration values.

Preferably, the radon management server may convert the user action mission information corresponding to the amount of change in the calculated alpha particle concentration value into the database (DB) for each amount of change in the alpha particle concentration value so as to reduce the amount of change in the alpha particle concentration value and include information of action mission contents and action mission execution time, store and manage the user action mission information in a separate storage device, wherein the radon management server may extract the amount of change in the alpha particle concentration value at a time of generating the radon generation event information data, read, from the storage device, the user action mission information corresponding to the amount of change in the extracted alpha particle concentration value, and determine that the action mission contents included in the read user action mission information has been performed by a user, when the alpha particle concentration value transmitted in real time from each radon detector within the action mission execution time included in the read user action mission information is less than the average value of the alpha particle concentration values previously stored in the storage device.

Preferably, when it is determined that the action mission contents included in the read user action mission information has been performed by the user, the radon management server may provide a preset reward on the basis of information on the corresponding user.

Preferably, the radon management server may collect the unique device identification information together with the alpha particle concentration value transmitted from each radon detector during a preset first measurement period, analyze the alpha particle concentration values collected during the first measurement period, extract a first alpha particle concentration pattern, convert the extracted first alpha particle concentration pattern into the database (DB) for each radon detector, and store and manage the first alpha particle concentration pattern.

Preferably, the radon management server may collect the unique device identification information along with the alpha particle concentration value transmitted from each radon detector during a preset second measurement period, analyze the alpha particle concentration values collected during the second measurement period, extract a second alpha particle concentration pattern, determine that a change has occurred in a periodic action pattern of the corresponding user in a specific place when the second alpha particle concentration pattern does not match the first alpha particle concentration pattern, generate a notification message, and then transmit the generated notification message to a preset external terminal held by the corresponding user.

Preferably, the radon management server may convert user action recommendation information corresponding to the average value of the alpha particle concentration values collected during the second measurement period into the database (DB) for each average value of the alpha particle concentration values, store and manage the user action recommendation information in a separate storage device, calculate the average value of the alpha particle concentration values collected during the second measurement period when the second alpha particle concentration pattern does not match the first alpha particle concentration pattern, read, from the storage device, the user action recommendation information corresponding to the average value of the calculated alpha particle concentration values, and generate the notification message by using the read user action recommendation information.

Preferably, the radon management system may further include a radon reduction facility including at least one discharging fan that suctions air entering a specific space through a vent pipe connected to the specific space, discharges the suctioned air to an external space, and reduces concentration of the alpha particles contained in the suctioned air, Preferably, the radon management server may collect the unique device identification information together with the alpha particle concentration value transmitted from each radon detector during a preset first measurement period, analyze the alpha particle concentration values collected during the first measurement period, extract a first alpha particle concentration pattern, convert the extracted first alpha particle concentration pattern into the database (DB) for each radon detector, store and manage the first alpha particle concentration pattern, collect the unique device identification information along with the alpha particle concentration value transmitted from each radon detector during a preset second measurement period, analyze the alpha particle concentration values collected during the second measurement period, extract a second alpha particle concentration pattern, determine that a change has occurred in a periodic action pattern of the corresponding user in the specific place when the second alpha particle concentration pattern does not match the first alpha particle concentration pattern, and control an operation of the radon reduction facility.

Preferably, the radon management server may transfer a request message asking whether a change has occurred in the periodic action pattern of the corresponding user to a preset external terminal held by the corresponding user when it is determined that the change has occurred in the periodic action pattern of the corresponding user in the specific place, and control each radon reduction facility to operate until a value where the alpha particle concentration value transmitted from each radon detector is less than the alpha particle concentration value obtained before the change in the corresponding user's periodic action pattern occurs is detected when there is no response to the request message during a preset response time from the preset external terminal or when receiving a response notifying that the change has occurred in the user's periodic action pattern.

Preferably, the radon management server may determine that the radon reduction facility is not operating properly when receiving the response notifying that no change has occurred in the user's periodic action pattern from the preset external terminal, generate a warning message notifying that the radon reduction facility is in an abnormal state, and transmit the warning message to the preset external terminal through the communication network.

Preferably, the radon management server may determine that the radon reduction facility is not operating properly when the alpha particle concentration value transmitted from each radon detector after the preset radon reduction reference time is unable to become a value which is less than the alpha particle concentration value obtained before the change of the corresponding user's periodic action pattern occurs, determine that the radon reduction facility is not operating properly, generate a warning message notifying that the radon reduction facility is in an abnormal state, and transmit the warning message to the preset external terminal through the communication network.

Preferably, the preset measurement period may be set as a period of measurement every 10 minutes for an hour.

Preferably, the radon management server may collect the unique device identification information along with the alpha particle concentration value transmitted from each radon detector during the preset measurement period, learn and analyze the collected alpha particle concentration values, generate a radon concentration pattern over time, convert the radon concentration pattern into the database (DB) for each radon detector, store and manage the radon concentration pattern in a separate storage device, generate a push alarm message for notifying a radon concentration risk when the alpha particle concentration value transmitted in real time from each radon detector is greater than a value of the radon concentration pattern previously stored in the storage device or greater than the preset radon concentration risk reference value, and transmit the push alarm message to a preset external terminal through the communication network.

Preferably, the push alarm message for notifying the radon concentration risk may include ventilation time information corresponding to the alpha particle concentration value transmitted from each radon detector.

Preferably, the radon management server may provide a cloud computing service in response to a request from at least one client terminal, and provide a cloud web service so as to download, through each client terminal, radon management-related information data converted into the database (DB) and stored in a separate storage device.

Preferably, the radon management server may encrypt and store the radon management-related information data by using a symmetrical or asymmetric encryption method in a case of converting the radon management-related information into the database (DB) so as to be stored in the storage device, and provide a service so that a decryption key capable of decrypting the encrypted radon management-related information data is transmitted to each client terminal.

Preferably, each client terminal may search in real time the radon management-related information data stored in the storage device of the radon management server by using the cloud web service of a client member login of the radon management server, display the radon management-related information data on a display screen, decrypt the radon management-related information data encrypted and stored in the storage device of the radon management server by using the corresponding client member login information together with the decryption key transmitted from the radon management server, search in real time and display the radon management-related information data on the display screen, search in real time the radon management-related information data stored in the storage device of the radon management server through a radon management-related application downloaded from the radon management server, and display the radon management-related information data on the display screen.

Preferably, based on the unique device identification information together with the alpha particle concentration value transmitted from each radon detector or the average value of the calculated alpha particle concentration values, the radon management server may provide a service for the radon management-related information data to be displayed on a display screen of an administrator or displayed on the user's display screen provided in an external terminal, so that the administrator may be able to monitor the radon management-related information data for each radon detector on a daily, day of the week, weekly, monthly, quarterly, and yearly basis, and on the basis of a real-time GIS (Geographic Information System).

Advantageous Effects

According to a radon management system using a radon detector of the present invention described above, the radon management system has an advantage in that radon concentration of a specific space indoors and/or outdoors is obtained, in real time and/or periodically, by using at least one radon detector installed in the corresponding specific space, radon concentration data for each radon detector is converted into a database (DB) to be stored and managed therein by using a radon management server connected to each radon detector through a communication network, and cloud computing services are provided in response to a request from an external terminal, so as to enable efficient management of radon concentration data of each radon detector installed in the specific space indoors and/or outdoors.

BEST MODE

The above-described objectives, features, and advantages will be described later in detail with reference to the accompanying drawings, and accordingly, those skilled in the art to which the present invention pertains will be able to easily implement the technical idea of the present invention. In addition, in describing the present disclosure, when it is determined that a detailed description of a known technology related to the present disclosure may unnecessarily obscure the subject matter of the present disclosure, the detailed description thereof will be omitted.

It will be understood that, although the terms including ordinal numbers, such as first, second, etc. may be used herein to describe various elements, these elements should not be limited by these terms. These terms are only used for the purpose of distinguishing one element from another element. For example, the first component may be referred to as a second component without departing from the scope of the present disclosure, and similarly, the second component may be referred to as a first component. The terminology used herein is for the purpose of describing particular exemplary embodiments only and is not intended to be limiting. As used herein, the singular forms are intended to include the plural forms as well, unless the context clearly indicates otherwise.

The terms used in the present disclosure have selected general terms that are currently widely used as possible while considering functions in the embodiments of the present disclosure, but this may vary according to the intention of a technician working in the field, the judicial precedent, the emergence of new technologies, etc. In addition, in certain cases, there are terms arbitrarily selected by the applicant, and in this case, the meaning of the terms will be described in detail in the description of the corresponding embodiments of the present disclosure. Therefore, the terms used in the present disclosure should be defined based on the meaning of the terms and the overall contents of the present disclosure, not simple names of the terms.

Throughout the description of the present invention, when a part is said to "include" or "comprise" a certain component, it means that it may further include or comprise other components, except to exclude other components unless the context clearly indicates otherwise. In addition, terms such as "... unit" and "... module" described in the specification mean units that process at least one function or operation, which may be implemented as hardware or software, or a combination of hardware and software.

Hereinafter, an exemplary embodiment of the present invention will be described in detail with reference to the accompanying drawings. It should be understood that the exemplary embodiment of the present invention may be changed to a variety of embodiments and the scope and spirit of the present invention are not limited to the exemplary embodiment described hereinafter. The embodiments of the present invention are provided to more completely describe the present invention to those skilled in the art.

Combinations of each block of an attached block diagram and each step of the flowchart may be performed by computer program instructions (i.e., execution engine), and since these computer program instructions can be loaded on a processor of a general purpose computer, special purpose computer, or other programmable data processing equipment, the instructions, executed by the processor of the computer or other programmable data processing equipment, will produce means for performing the functions described in each block of the attached block diagram or each step of the flowchart. In order to implement functionality in a specific way, these computer program instructions may also be stored in a computer usable or computer readable memory capable of supporting a computer or other programmable data processing equipment, so that the instructions stored in the computer usable or computer readable memory are able to produce articles of manufacture containing an instruction means for performing functions described in each block in the block diagram or in each step in the flowchart.

In addition, since the computer program instructions may be loaded on the computer or other programmable data processing equipment, a series of operational steps are performed on the computer or other programmable data processing equipment to generate a computer-executed process, so that it is also possible for instructions executing the computer or other programmable data processing equipment to provide steps for executing the functions described in each block of the block diagram and each step of the flowchart.

In addition, it should be noted that each block or each step may represent a module, segment, or part of code that contains one or more executable instructions for executing specified logical functions, and in some alternative embodiments, it is also possible for the functions mentioned in the blocks or steps to be performed out of order. For example, two blocks or steps shown in succession may in fact be performed substantially simultaneously, and the blocks or steps may be performed in the reverse order of the corresponding functions as necessary.

Figure 1:
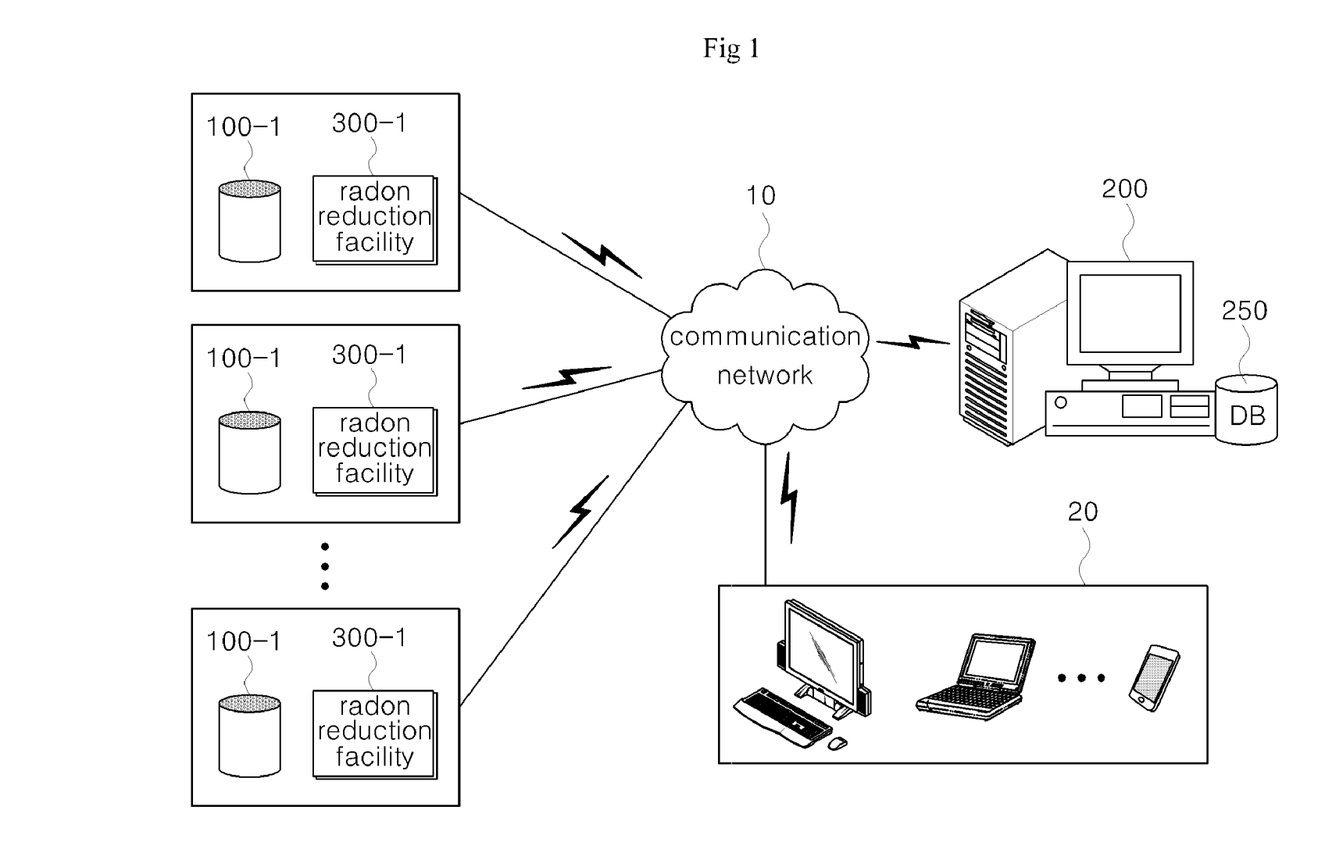
FIG. 1 is an overall block diagram illustrating a radon management system using a radon detector according to an exemplary embodiment of the present invention.
Figure 2:
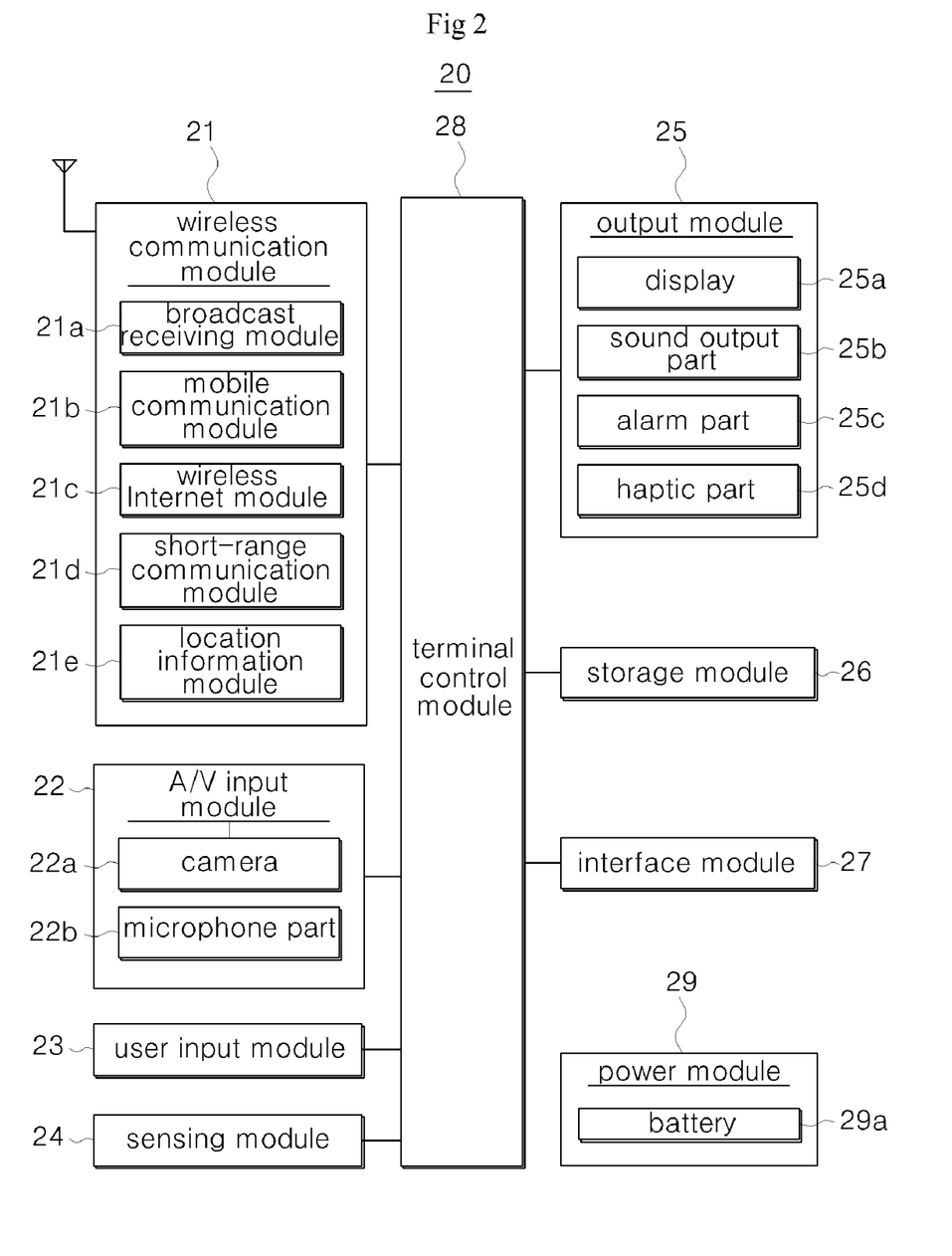
FIG. 2 is a detailed block diagram illustrating an external terminal applied to the exemplary embodiment of the present invention.

FIG. 1 is an overall block diagram illustrating a radon management system using a radon detector according to an exemplary embodiment of the present invention, and FIG. 2 is a detailed block diagram illustrating an external terminal applied to the exemplary embodiment of the present invention.

Referring to FIGS. 1 and 2, the radon management system using the radon detector according to the exemplary embodiment of the present invention includes at least one of radon detectors 100-1 to 100-N, and a radon management server 200, etc. In addition, the radon management system using the radon detector according to the exemplary embodiment of the present invention may further include at least one of radon reduction facility 300-1 to 300-N, at least one external terminal 20, etc. Meanwhile, since the components shown in FIGS. 1 and 2 are not essential, the radon management system using the radon detector according to the exemplary embodiment of the present invention may have more components or fewer components than the components shown in FIGS. 1 and 2.

Hereinafter, components of a radon management system using a radon detector according to the exemplary embodiment of the present invention will be described in detail.

Each radon detector 100-1 to 100-N is installed in a specific space indoors and/or outdoors (e.g., building, home, hospital, school, and the like), alpha particles present in the specific space are detected in real time so that a predetermined alpha particle detection signal is output, and a preset measurement time is counted on the basis of the output alpha particle detection signal, thereby calculating an alpha particle concentration value.

In addition, each radon detector 100-1 to 100-N performs a function of transmitting unique device identification information together with the calculated alpha particle concentration value to a radon management server 200.

In this case, the preset unique device identification information preferably includes at least one piece of information, including: for example, a name, a password, a serial number, a type, a manufacturer, a MAC (Media Access Control) address, a unique IP (Internet Protocol) address, a model, a version, and authentication information generated by a private key or a PKI-based private key.

Each of these radon detectors 100-1 to 100-N is preferably composed of, for example, a pulsed ionization chamber type radon detector, but is not limited thereto, and for example, a surface barrier type detector, a high purity semiconductor detector (i.e., a pure Ge detector), a scintillation detector, a solid state junction counter, and the like may be applied as the device for detecting alpha particles.

That is, a radon detector with a pulsed ionization chamber type has a structure in which an electrode with a shape of a probe is installed in the center of a cylindrical box made of metal and an electric field is generated by applying a bias voltage between the metal cylindrical box and the probe therein.

When alpha decay occurs inside the ionization chamber and alpha particles are emitted, even though the alpha particles are extinct due to a collision with air, ion charges are generated. Accordingly, when absorbing the ion charges through a central probe and amplifying signals, the alpha particles may be detected. Since the sensor itself is composed of a metal cylinder and a probe, the sensor has an advantage of being very inexpensive, having good durability, and improving ventilation due to the fact that the sensor is not affected by light.

Referring to the surface barrier type detector, due to a surface level or an oxide film, a surface of a semiconductor is formed with a depletion layer such as a PN junction, whereby the vicinity of the surface becomes an obstacle for charge transfer. For practical use, gold is deposited on a surface of n-type Si at about 100 μm/cm², and is used as one electrode, so that radiation is incident on a back surface thereof. Here, the depletion layer has various thicknesses of about 50~500 μm, and since energy loss at the surface is small, the depletion layer is mainly used for detection of charged particles generated by alpha radiation and has good energy resolution.

The high-purity semiconductor detector is generally referred to as a pure Ge detector. The pure Ge detector is composed of a high-purity Ge crystal having very small impurity concentrations and defects, having a very high electrical resistance at low temperatures, and having a high bias voltage applied thereto as well. The difference between pure Ge and Ge(Li) is that the pure Ge is able to be stored at room temperature, is convenient for maintenance because pure Ge can be used after cooling with liquid nitrogen only when measuring, and has energy resolution that is not inferior to Ge(Li), thereby being put into practical use.

Referring to the scintillation detector, the phenomenon of emitting light when charged particles collide with a substance has been known for a long time, and light emission of NaI coating or zinc sulfide (ZnS) by alpha radiation is particularly strong and is able to be detected and counted with a magnifying glass in a dark room.

Such light emission is called scintillation, and the substance that exhibits this phenomenon is called a scintillator.

In addition, the scintillator coupled with a photomultiplier tube is called a scintillation detector, and in particular, a device using a method for counting by a pulse output is called a scintillation counter tube.

Meanwhile, a device using a method of reading an output by direct current is mainly used for dosimetry, and since a scintillator is used, the device is called a scintillation dosimeter. For the scintillator, any solid, liquid, or gas is used, and when liquid is used, the scintillator is called a liquid scintillation counting device.

The solid junction counter is a solid reverse-biased PN junction semiconductor, is a counter configured to collect ionic charges from alpha particles passing through a depletion layer, and may be manufactured in a small, mobile type.

In addition, the radon management server 200 is connected to each radon detector 100-1 to 100-N through a communication network 10, and in this case, the communication network 10 is a high-speed backbone network of a large communication network capable of providing large-volume, long-distance voice and data services, and may be a next-generation wireless communication network including WiFi, WiGig, Wibro (Wireless Broadband Internet), and Wimax (World Interoperability for Microwave Access), which are for providing Internet or high-speed multimedia services.

The Internet refers to a worldwide open computer network structure that provides various services present on a TCP/IP protocol and an upper layer of the TCP/IP, the services including: HTTP (Hyper Text Transfer Protocol), Telnet, FTP (File Transfer Protocol), DNS (Domain Name System), SMTP (Simple Mail Transfer Protocol), SNMP (Simple Network Management Protocol), NFS (Network File Service), NIS (Network Information Service), etc. The Internet provides an environment in which each radon detector 100-1 to 100-N and/or an external terminal 20 are allowed to be connected to the radon management server 200. Meanwhile, the Internet may be a wired or wireless Internet, or may be a core network integrated with a wired public network, a wireless mobile communication network, or a mobile Internet.

When provided with a mobile communication network, the communication network 10 may be a synchronous mobile communication network or an asynchronous mobile communication network. A wideband code division multiple access (WCDMA) communication network may be referred to as an exemplary embodiment of the asynchronous mobile communication network. In this case, although not shown in the drawings, the mobile communication network may include, for example, a Radio Network Controller (RNC), etc. Meanwhile, although the WCDMA network is referred to as an example, the communication network 10 may be a next-generation communication network such as a cellular-based 3G network, an LTE network, a 4G network, a 5G network, and other IP-based IP networks. Such a communication network 10 serves to allow the communication part 900 and the external terminal 20 to mutually transmit signals and data therebetween.

In addition, the radon management server 200 performing a function, including: collecting the unique device identification information along with the alpha particle concentration value transmitted from each radon detector 100-1 to 100-N during a preset measurement period; calculating and quantifying an average value of the collected alpha particle concentration values; converting the average value into a database (DB) for each radon detector; and storing and managing the average value in a separate storage device 250.

In addition, the radon management server 200 performs a function, including: comparing the alpha particle concentration value transmitted in real time from each radon detector 100-1 to 100-N and the previously stored alpha particle concentration average values, calculating an amount of change in the alpha particle concentration value, and generating radon generation event information data according to the amount of change in the calculated alpha particle concentration value.

In addition, the radon management server 200 may perform a function of generating the radon generation event information data when the calculated amount of change in the alpha particle concentration value is greater than a preset reference amount of change.

In addition, the radon management server 200 may perform a function of transmitting the generated radon generation event information data to at least one of external terminals 20 (e.g., a user terminal, an administrator terminal, a client terminal, etc.) through the communication network 10.

In addition, the radon management server 200 may perform a function of converting user action mission information corresponding to the calculated amount of change in the alpha particle concentration value into the database (DB) for each amount of change in each alpha particle concentration value, and storing and managing the user action mission information in a separate storage device 250.

In addition, the radon management server 200 may perform a function, including: extracting the amount of change in the alpha particle concentration value at the time of generating the radon generation event information data, reading, from the storage device 250, the user action mission information corresponding to the amount of change in the extracted alpha particle concentration value, and generating the radon generation event information data by using the read user action mission information.

In this case, it is preferable that the user action mission information includes, for example, information of action mission contents and/or action mission execution time, etc., so as to reduce the amount of change in the alpha particle concentration value.

In addition, when collecting the alpha particle concentration value transmitted from each radon detector 100-1 to 100-N during a preset measurement period, the radon management server 200 may perform a function, including: determining the alpha particle concentration value transmitted from each radon detector 100-1 to 100-N as noise in a case where the alpha particle concentration values is greater than the preset maximum alpha particle concentration value or less than the preset minimum alpha particle concentration value; and calculating an average value of the alpha particle concentration values by using only the alpha particle concentration value, excluding the alpha particle concentration value determined as the noise, among the collected alpha particle concentration values. In this case, it is preferable that the preset measurement period is set as, for example, a period of measurement every 10 minutes for 1 hour.

In addition, the radon management server 200 may perform a function, including: converting the user action mission information corresponding to the calculated amount of change in the alpha particle concentration value into the database (DB) for each amount of change in the alpha particle concentration value, so that the information of the action mission contents and/or action mission execution time is included and the amount of change in the alpha particle concentration value is reduced; and storing and managing the user action mission information in a separate storage device 250.

In addition, the radon management server 200 may perform a function, including: extracting an amount of change in the alpha particle concentration value at the time of generating the radon generation event information data; reading, from the storage device 250, the user action mission information corresponding to the amount of change in the extracted alpha particle concentration value; and determining that the action mission contents included in the read user action mission information has been performed by a user, when the alpha particle concentration value transmitted in real time from each radon detector 100-1 to 100-N within the action mission execution time included in the read user action mission information is less than the average value of the alpha particle concentration values previously stored in the storage device 250.

In addition, when it is determined that the action mission contents included in the read user action mission information has been performed by the corresponding user, the radon management server 200 may perform a function of providing a preset reward (e.g., reward points, reward products, reward cash, and the like) on the basis of the information on the corresponding user.

In addition, the radon management server 200 may perform a function, including: collecting unique device identification information together with the alpha particle concentration value transmitted from each radon detector 100-1 to 100-N during a preset first measurement period; analyzing the alpha particle concentration values collected during the first measurement period; extracting a first alpha particle concentration pattern; converting the extracted first alpha particle concentration pattern into the database (DB) for each radon detector; and storing and managing the first alpha particle concentration pattern. In this case, it is preferable that the preset first measurement period is set as, for example, a period of measurement every 10 minutes for 1 hour.

In addition, the radon management server 200 may perform a function, including: collecting unique device identification information along with the alpha particle concentration value transmitted from each radon detector 100-1 to 100-N during a preset second measurement period; analyzing the alpha particle concentration values collected during the second measurement period; extracting a second alpha particle concentration pattern; generating a notification message by determining that a change has occurred in a periodic action pattern of a corresponding user in a specific place, in a case where the second alpha particle concentration pattern does not match the first alpha particle concentration pattern; and then transmitting the generated notification message to a preset external terminal 20 held by the corresponding user. In this case, it is preferable that the preset second measurement period is set as, for example, a period of measurement every 10 minutes for 1 hour.

In addition, the radon management server 200 may perform a function, including: converting user action recommendation information corresponding to an average value of the alpha particle concentration values collected during the second measurement period into the database (DB) for each average value of the alpha particle concentration values; storing and managing the user action recommendation information in a separate storage device 250; calculating an average value of the alpha particle concentration values collected during the second measurement period when the second alpha particle concentration pattern does not match the first alpha particle concentration pattern; reading, from the storage device 250, the user action recommendation information corresponding to the average value of the calculated alpha particle concentration values; and generating a notification message by using the read user action recommendation information.

In addition, the radon management server 200 may perform a function, including: collecting the unique device identification information together with the alpha particle concentration value transmitted from each radon detector 100-1 to 100-N during the preset first measurement period; analyzing the alpha particle concentration values collected during the first measurement period; extracting the first alpha particle concentration pattern; converting the extracted first alpha particle concentration pattern into the database (DB) for each radon detector; and storing and managing the first alpha particle concentration pattern in the separate storage device 250.

In addition, the radon management server 200 may perform a function, including: collecting unique device identification information along with an alpha particle concentration value transmitted from each radon detector 100-1 to 100-N during a preset second measurement period; analyzing alpha particle concentration values collected during the second measurement period; extracting a second alpha particle concentration pattern; determining that a change has occurred in a periodic action pattern of a corresponding user in a specific place, in a case where the second alpha particle concentration pattern does not match the first alpha particle concentration pattern; and controlling an operation of each radon reduction facility 300-1 to 300-N.

In addition, the radon management server 200 may perform a function, including: transferring a request message asking whether a change has occurred in the periodic action pattern of the corresponding user to a preset external terminal 20 held by the corresponding user when it is determined that the change has occurred in the periodic action pattern of the corresponding user in the specific place; and controlling each radon reduction facility 300-1 to 300-N to operate until a value where the alpha particle concentration value transmitted from each radon detector 100-1 to 100-N is less than the alpha particle concentration value obtained before the change in the corresponding user's periodic action pattern occurs is detected, when there is no response to the request message during a preset response time from the preset external terminal 20 or when receiving a response notifying that a change has occurred in the corresponding user's periodic action pattern.

In addition, the radon management server 200 may perform a function, including: determining that each radon reduction facility 300-1 to 300-N is not operating properly, when a response is received notifying that no change has occurred in the user's periodic action pattern from the preset external terminal 20; generating a warning message notifying that each radon reduction facility 300-1 to 300-N is in an abnormal state; and transmitting the warning message to the preset external terminal 20 through the communication network 10.

In addition, the radon management server 200 may perform a function, including: determining that each radon reduction facility 300-1 to 300-N is not operating properly when the alpha particle concentration value, transmitted from each radon detector 100-1 to 100-N after a preset radon reduction reference time, is unable to become a value which is less than the alpha particle concentration value obtained before the change of the corresponding user's periodic action pattern occurs; determining that each radon reduction facility 300-1 to 300-N is not operating properly; generating a warning message notifying that each radon reduction facility 300-1 to 300-N is in an abnormal state; and transmitting the warning message to the preset external terminal 20 through the communication network 10. In this case, it is preferable that the preset measurement period is set as, for example, a period of measurement every 10 minutes for 1 hour.

In addition, the radon management server 200 may perform a function, including: collecting unique device identification information along with the alpha particle concentration value transmitted from each radon detector 100-1 to 100-N during the preset measurement period; learning and analyzing the collected alpha particle concentration values; generating a radon concentration pattern over time; converting the radon concentration pattern into the database (DB) for each radon detector; and storing and managing the radon concentration pattern in the separate storage device 250.

In addition, the radon management server 200 may perform a function, including: generating a push alarm message for notifying a risk of radon concentration, when the alpha particle concentration value transmitted in real time from each radon detector 100-1 to 100-N is greater than the value of the radon concentration pattern previously stored in the storage device 250 or greater than the preset radon concentration risk reference value; and transmitting the push alarm message to the preset external terminal 20 through the communication network 10.

In this case, the push alarm message for notifying the risk of radon concentration preferably includes, for example, ventilation time information corresponding to the alpha particle concentration value transmitted from each radon detector 100-1 to 100-N.

In addition, the radon management server 200 may perform a function of providing a cloud computing service in response to a request from the external terminal 20 (e.g., a user terminal, an administrator terminal, a client terminal, and the like) through the communication network 10.

That is, the radon management server 200 is physical equipment that is connected to a plurality of terminals 20, held by an administrator, on a network through a communication network 10, and provides system resources (i.e., this is a concept including an OS, CPU, memory, storage device, and the like) to the plurality of terminals 20. In a cloud service environment, a plurality of servers is connected to the plurality of terminals 20 on a network. In this case, the radon management server 200 is illustrated as a concept including the plurality of servers, and for example, through a guest machine in a virtual space generated through virtualization technology, the plurality of terminals 20 distributes the system resources to be used. These configurations may be understood as well-known general concepts.

In this case, the cloud service environment is referred to as the technology of Internet-based (i.e., cloud) computing. Such cloud computing is illustrated as a computer network diagram expressing the Internet as a cloud, having a hidden complex infrastructure, and having a computing style in which IT-related functions are provided in the form of services. Users are able to use the Internet to access the services provided by the cloud computing.

In addition, the cloud computing is applied by mixing various computing concepts and communication technologies such as virtualized computing, utility computing, and on-demand computing, and is referred to as the technology in which a single virtual computer or service is generally implemented by integrating a plurality of data centers composed of a plurality of computers with virtualization technology, and users are allowed to access the virtual computer or service and then provided with various software, security solutions, and computing capabilities in an on-demand method.

That is, the cloud computing is an "on-demand outsourcing service of IT resources through the Internet", and is a method in which programs or documents that were individually stored on personal computers or corporate servers are stored in an Internet-based virtual server or storage, and cloud applications such as web browsers are executed by using various terminals including personal computers, thereby allowing the users to perform desired operations.

In this case, the users may select and use computing resources such as cloud applications, storage, OS, and security as much as they desire at the time they desire, and pay a price based on the usage.

The above-described radon management server 200 may perform a function of providing a cloud computing service in response to a request from at least one external terminal 20.

That is, the radon management server 200 is a server that provides the cloud computing service to at least one external terminal 20, and provides computing resources requested by the at least one external terminal 20 to the users through the communication network 10. The radon management server 200 may provide the computing service for using a device requested by the at least one external terminal 20.

Such a radon management server 200 is provided with a plurality of storage devices, that is, storages that store files provided from a service provider (i.e., contents provider) who provides large-volume data, including: for example, an application program file, a game program file, a text data file, a document file, a picture file, a music file, a video file, a bar code file, etc.

In addition, the radon management server 200 may perform a function of providing a cloud web service so that radon management-related information data that is converted into the database (DB) and stored in a separate storage device 250 through each external terminal 20 may be downloaded, the radon management-related information data including: for example, an alpha particle concentration value, an average value of alpha particle concentration values, a radon concentration pattern, a warning message, a push alarm message, etc.

In addition, when the radon management-related information is converted into the database (DB) and stored in the storage device 250, the radon management server 200 may perform a function, including: encrypting and storing the radon management-related information data by using a symmetric or asymmetric encryption method; and providing a service so that a decryption key capable of decrypting the encrypted radon management-related information data is transmitted to each external terminal 20.

In addition, based on the unique device identification information together with the alpha particle concentration value transmitted from each radon detector 100-1 to 100-N and/or the average value of the calculated alpha particle concentration values, the radon management server 200 may perform a function of providing a service to be displayed on a display screen of an administrator or displayed on a user's display screen provided in an external terminal 20, so that the administrator may monitor the radon management-related information data for each radon detector on a daily, day of the week, weekly, monthly, quarterly, and/or yearly basis, and on the basis of a real-time GIS (Geographic Information System).

In addition, the radon management server 200 may further include: at least one radon reduction facility 300-1 to 300-N that includes at least one discharging fan (not shown) that suctions air introduced into a specific space through a vent pipe and/or a vacuum pipe (not shown), which are connected to the specific space, discharges the suctioned air to an external space, and reduces the concentration of alpha particles contained in the suctioned air.

Although not illustrated in the drawings, each radon reduction facility 300-1 to 300-N preferably further includes: an outdoor air inlet pipe (not shown) connected to the outside so that diluted air for radon vapor flows under a floor of a specific space; and a valve (not shown) for controlling the flow of air in the outdoor air inlet pipe.

In addition, each radon reduction facility 300-1 to 300-N may further include: a heat recovery fan (not shown) and/or an energy recovery fan (not shown) for reducing energy loss through heat exchange of air in the specific space and the outdoors.

Meanwhile, although not specifically shown in the drawing, each radon reduction facility 300-1 to 300-N may be implemented by applying commonly well-known related art, for example, the technologies disclosed in Korean Patent No. 10-0988022 (published on Oct. 18, 2010), Korean Patent No. 10-1569270 (published on Nov. 13, 2015), Korean Patent No. 10-1650436 (published on Aug. 23, 2016), Korean Patent Application Publication No. 10-2016-0024076 (published on Mar. 4, 2016), etc.

Furthermore, at least one external terminal 20 (e.g., a user terminal, an administrator terminal, a client terminal, and the like) may be further included in each radon reduction facility 300-1 to 300-N.

Each of these external terminals 20 performs a function, including: using a cloud web service for a client member login of the radon management server 200; searching, in real time, radon management-related information data stored in the storage device 250 of the radon management server 200; and displaying the radon management-related information data on a display screen.

In addition, each external terminal 20 may perform a function, including: using the decryption key transmitted from the radon management server 200 together with the corresponding information of the client member login; decrypting the radon management-related information data encrypted and stored in the storage device 250 of the radon management server 200; and searching and displaying the radon management-related information data on a display screen in real time.

In addition, each external terminal 20 may perform a function, including: searching, in real time, the radon management-related information data stored in the storage device 250 of the radon management server 200 through a radon management-related application downloaded from the radon management server 200; and displaying the radon management-related information data on a display screen.

Meanwhile, each external terminal 20 applied to the exemplary embodiment of the present invention preferably includes at least any one of mobile terminal devices, including: a smart phone, a smart pad, or a smart note, which communicates through wireless Internet or mobile Internet, and may be collectively referred to as any wired or wireless home appliance/communication device having a user interface for accessing the radon management server 200.

As shown in FIG. 2, each of these external terminals 20 may include: a wireless communication module 21, an audio/video (A/V) input module 22, a user input module 23, a sensing module (24), an output module 25, a storage module 26, an interface module 27, a terminal control module 28, a power module 29, etc. Meanwhile, since the components shown in FIG. 2 are not essential, the external terminal 20 may have more components or fewer components than the components shown in FIG. 2.

Hereinafter, a detailed description of the components of each external terminal 20 is as follows.

The wireless communication module 21 may include one or more modules that enable wireless communication between each external terminal 20 and the radon management server 200. For example, the wireless communication module 21 may include a broadcast receiving module 21a, a mobile communication module 21b, a wireless Internet module 21c, a short-range communication module 21d, a location information module 21e, etc.

The broadcast receiving module 21a receives broadcast signals (e.g., TV broadcast signals, radio broadcast signals, data broadcast signals, and the like) and/or broadcast-related information from an external broadcast management server through various broadcast channels (e.g., satellite channels, terrestrial channels, and the like).

The mobile communication module 21b transmits and receives a wireless signal with at least one of a base station, each external terminal 20, and a server on a mobile communication network. The wireless signal may include a voice call signal, a video call signal, or various types of data according to transmission/reception of text/multimedia messages.

The wireless Internet module 21c is a module for wireless Internet access, and may be built-in or external to each external terminal 20. As the wireless Internet technology, for example, WLAN (Wi-Fi), Wibro, Wimax, HSDPA, LTE, and the like may be used.

The short-range communication module 21d is a module for short-range communication, and may use, for example, Bluetooth communication, ZigBee communication, UWB (Ultra-Wideband) communication, RFID (Radio Frequency Identification) communication, or infrared (IrDA, infrared Data Association) communication, etc.

The location information module 21e is a module for checking or obtaining a location of each external terminal 20, and may obtain current location information of each external terminal 20 by using a Global Position System (GPS), etc.

Meanwhile, it is possible to perform data communication with the radon management server 200 by using a specific application program stored in the storage module 26 through the above-described wireless communication module 21 and/or wired communication module (not shown) under the control of the terminal control module 28.

The AJV input module 22 is a module for inputting an audio signal or a video signal, and may fundamentally include a camera 22a, a microphone part 22b, etc. The camera 22a processes image frames such as still images or moving pictures that are obtained by an image sensor in a video call mode or a photographing mode. The microphone part 22b receives an external sound signal by a microphone in a call mode, a recording mode, or a voice recognition mode, and processes the external sound signal as electrical voice data.

The user input module 23 is a module that generates input data for controlling an operation of the external terminal 20, and in particular, performs a function of inputting a selection signal for any one piece of the data management information displayed through the display 25a of the output module 25. The selection signal may be, for example, a touch panel type input by a user's touch (with a static pressure/electricity type) or may be input by using a separate input device (e.g., a keypad dome switch, a jog wheel, a jog switch, and the like).

The sensing module 24 generates a sensing signal for controlling the operation of the external terminal 20 by detecting a current state of the external terminal 20, the current state being an open/closed state of the external terminal 20, a location of the external terminal 20, presence or absence of user contact, user's action of touching to a specific part, an orientation of the external terminal 20, acceleration/deceleration of the external terminal 20, etc. Such a sensing signal is transmitted to the terminal control module 28, and may serve as a basis for the terminal control module 28 to perform a specific function.

The output module 25 is a module for generating an output related to a visual, auditory, or tactile sense, and fundamentally, may include a display 25a, a sound output part 25b, an alarm part 25c, and a haptic part 25d, and the like.

The display 25a is for displaying and outputting information processed by the external terminal 20. For example, when the external terminal 20 is in a call mode, a user interface (UI) or a GUI (Graphical User Interface), which are related to a call, is displayed, and when the external terminal 20 is in a video call mode or a photographing mode, a photographed and/or received image, and UI or GUI are displayed on the display 25a.

For example, in a mode including: a call signal reception mode; a call mode or a recording mode; a voice recognition mode; a broadcast reception mode; and the like, the sound output part 25b may output audio data which is stored in the storage module 26 or received from the wireless communication module.

The alarm part 25c may output a signal for notifying the occurrence of an event of each external terminal 20. Examples of events occurring in the external terminal 20 include call signal reception, message reception, key signal input, touch input, etc.

The haptic part 25d generates various tactile effects that a user may feel. A typical example of the tactile effect generated by the haptic part 25d is vibration. The intensity and pattern of the vibration generated by the haptic part 25d may be controlled.

The storage module 26 may store a program for an operation of the terminal control module 28, and may temporarily store input/output data (e.g., data related to a phonebook, a message, a still image, a video, and the like).

In addition, the storage module 26 may store data on numerous vibration and sound of various patterns, which are output when inputting a touch on a touch screen, and may store an application program related to the radon measurement.

In addition, since the storage module 26 may store source data for generating radon management-related information, radon management-related data may be constructed in a form composed of images and sounds, and a process and result of generating the radon management-related data may also be stored together.

Such a storage module 26 may include at least one type of storage medium, including a flash memory type storage, a hard disk type storage, a multimedia card micro type storage, a card type memory (e.g., SD or XD memory, etc.), a RAM, a SRAM, a ROM, an EEPROM, a PROM, a magnetic memory, a magnetic disk, an optical disc, etc.

The interface module 27 serves as a passage for all external devices connected to the external terminal 20. The interface module 27 receives data transmitted from an external device or power supplied from an external device, so as to transmit the data or power to each component inside each external terminal 20 or transmit the data inside the external terminal 20 to an external device.

The terminal control module 28 generally controls the overall operation of each external terminal 20, and performs related control and processing related to, for example, a voice call, data communication, a video call, execution of various applications, etc.

That is, the terminal control module 28 performs a control function so as to control a radon management-related application program stored in the storage module 26 to be executed, request generation of radon management-related data through execution of the radon management-related application program, and receive the radon management-related data for the above request.

In addition, through the execution of the radon measurement-related application program, the terminal control module 28 performs a control function so that in the process of generating the radon measurement-related data desired by a user, the auxiliary elements including at least one of video, audio, and sound are output to at least one of devices including the display 25a and other output devices (e.g., the sound output part 25b, the alarm part 25c, the haptic part 25d, and the like).

In addition, the terminal control module 28 may monitor the charging current and charging voltage of the battery 29a at all times, and temporarily store the monitored value in the storage module 26. In this case, it is preferable that the storage module 26 stores not only battery charging status information such as the monitored charging current and charging voltage, but also battery specification information (i.e., product code, rating, and the like).

The power module 29 receives external power and internal power applied under the control of the terminal control module 28 to supply the power necessary for the operation of each component. The power module 29 supplies power from the built-in battery 29a to each component to operate, and is capable of charging the battery by using a charging terminal (not shown).

Various exemplary embodiments described herein may be implemented in a recording medium that can be read by a computer or a similar device by using, for example, software, hardware, or a combination thereof.

According to the hardware implementation, the exemplary embodiment described herein may be implemented by using at least one of electrical parts for performing functions, including: ASICs (application specific integrated circuits), DSPs (digital signal processors), DSPDs (digital signal processing devices), PLDs (programmable logic devices), FPGAs (field programmable gate arrays), processors, controllers, microcontrollers, and microprocessors. In some cases, such exemplary embodiments may be implemented by the terminal control module 28.

According to the software implementation, the exemplary embodiments such as procedures or functions may be implemented together with separate software modules that perform at least one of functions or operations. A software code may be implemented by a software application written in an appropriate programming language. In addition, the software code may be stored in the storage module 26 and executed by the terminal control module 28.

Unlike ordinary mobile phones (also known as feature phones), when the external terminal 20 is configured to include a smartphone, the smartphone is to be a phone based on an open operating system that allows users to download, freely use, and delete various application programs they desire. The smartphone is preferably referred to as a communication device that includes: not only all mobile phones provided with mobile office functions, but also functions such as voice/video calls and Internet data communication, which are generally used; or any Internet phone or a tablet PC that does not have a voice call function, but is capable of accessing the Internet.

Such a smartphone may be implemented by applying a smartphone equipped with a variety of open operating systems, and the open operating systems may include, for example, Symbian of NOKIA, Blackberry of RIMS, iOS of Apple, Windows Mobile of Microsoft, Android of Google, Bada of Samsung Electronics, etc.

As described above, since a smartphone uses the open operating system, unlike a mobile phone having a closed operating system, a user is able to arbitrarily install and manage various application programs.

That is, the above-described smartphone fundamentally includes: a control part, a memory, a screen output part, a key input part, a sound output part, a sound input part, a camera, a wireless network communication module, a short-range wireless communication module, and a battery for power supply, etc.

The control part is a generic term for referring to a functional component that controls the operation of a smart phone, includes at least one processor and a memory for execution, and is connected to each part of the functional component provided in the smart phone through a bus.

Such an above-described control part loads and operates at least one program code provided in a smartphone through the processor into the memory for execution, and transfers the operation result to at least one part of the functional component through the bus so as to control the operation of the smartphone.

The memory is a generic term for a nonvolatile memory provided in a smartphone, and stores and maintains at least one program code executed through the control part and at least one data set used by the program code. The memory fundamentally stores: a system program code and a system data set corresponding to an operating system of a smartphone; a communication program code and a communication data set for processing wireless communication connection of the smartphone; and at least one application program code and application data set, wherein a program code and a data set for implementing the present invention are stored in the memory as well.

The screen output part is composed of a screen output device (e.g., liquid crystal display (LCD) device) and an output module that drives the screen output device, and is connected to the control part via the bus, thereby outputting an operation result, corresponding to a screen output among various operation results of the control part, on the screen output device.

The key input part is composed of a key input device having at least one key button (or a touch screen device interlocking with the screen output part) and an input module that drives the key input part, and is connected to the control part via the bus, thereby inputting a command that instructs various operations of the control part or inputting data necessary for the operation of the control part.

The sound output part includes: a speaker that outputs a sound signal; and a sound module that drives the speaker, and is connected to the control part via the bus, thereby outputting, through the speaker, an operation result corresponding to a sound output among various operation results of the control part. The sound module decodes sound data to be output through an existing speaker and converts the sound data into a sound signal.

The sound input part includes: a microphone that receives a sound signal; and a sound module that drives the microphone, and transmits the sound data input through the microphone to the control part. The sound module encodes the sound signal input through the microphone.

The camera includes an optical part, a charge coupled device (CCD), and a camera module for driving the same, and obtains bitmap data input to the CCD through the optical part. The bitmap data may include both video data and image data of a still image.

The wireless network communication module is a generic term for communication components for connecting wireless communication, is configured to include at least one of an antenna, an RF module, a baseband module, and a signal processing module, which are for transmitting and receiving radio frequency signals of a specific frequency band, and is connected to the control part via the bus, thereby transmitting, through wireless communication, an operation result corresponding to wireless communication among various operation results of the control part or receiving data through wireless communication, so as to transmit the data to the control part and simultaneously maintain the procedures of connection, registration, communication, and handoff of the wireless communication.

In addition, the wireless network communication module includes a mobile communication component that performs at least one of functions including: access to a mobile communication network, location registration, call processing, call connection, data communication, and handoff, in accordance with the CDMA/WCDMA standard. Meanwhile, according to the intention of those skilled in the art, the wireless network communication module according to the IEEE 802.16 standard further includes: a mobile Internet communication component for performing at least one of functions, including: access to the mobile Internet, location registration, data communication, and handoff, wherein It should be understood that the present invention is not limited by the wireless communication configuration provided by the wireless network communication module.

The short-range wireless communication module is configured to include a short-range wireless communication module that connects to a communication session by using a radio frequency signal as a communication medium within a predetermined distance, and according to ISO 180000 series standards, the short-range wireless communication module may preferably include at least one of RFID communication, Bluetooth communication, Wi-Fi communication, and public wireless communication. In addition, the short-range wireless communication module may be integrated with the wireless network communication module.

The smart phone configured as described above is referred to a terminal capable of performing wireless communication, and other than the smart phone, any device may be applicable as long as the device is a terminal capable of transmitting and receiving data through a network including the Internet. That is, the smart phone may include at least one or more of a notebook PC, and a tablet PC, which have a function of transmitting a short message and a function of connecting to a network, in addition to a mobile terminal capable of being carried and moved.

The preferred exemplary embodiment of the radon management system using the radon detector according to the present invention has been described above, but is not limited thereto, and it is possible to embody the present invention with various modifications within the scope of the claims, the detailed description of the invention, and the accompanying drawings, and these embodiment also belongs to the present invention.

INDUSTRIAL APPLICABILITY

The present invention is widely applicable in a radon management system.

The invention claimed is:

1. A radon management system using a radon detector, the radon management system comprising:
at least one of radon detectors installed in a specific space indoors or outdoors, and configured to detect in real time alpha particles present in the specific space, output a predetermined alpha particle detection signal, count for a measurement time preset based on the output alpha particle detection signal to calculate an alpha particle concentration value, and transmit unique device identification information together with the calculated alpha particle concentration value; and
a radon management server configured to collect the unique device identification information together with the alpha particle concentration value transmitted from each radon detector during a preset measurement period, calculate and quantify an average value of the collected alpha particle concentration values, convert the average value into a database (DB) for each radon detector, store and manage the average value, compare the alpha particle concentration value transmitted in real time from each radon detector and the average value of the previously stored alpha particle concentration values with each other, calculate an amount of change in the alpha particle concentration value, and generate radon generation event information data according to the amount of change in the calculated alpha particle concentration value,
wherein the radon management server converts user action mission information corresponding to the amount of change in the calculated alpha particle concentration value into the database (DB) for each amount of change in each alpha particle concentration value, stores and manages the user action mission information in a separate storage device, extracts the amount of change in the alpha particle concentration value at a time of generating the radon generation event information data, reads, from the storage device, the user action mission information corresponding to the amount of change in the extracted alpha particle concentration value, uses the read user action mission information, and generates the radon generation event information data.

2. The radon management system of claim 1, wherein the radon management server generates the radon generation event information data when the calculated amount of change in the alpha particle concentration value is greater than a preset reference amount of change.

3. The radon management system of claim 1, wherein the radon management server transmits the generated radon generation event information data to at least one external terminal through a communication network.

4. The radon management system of claim 1, wherein the user action mission information comprises information of action mission contents and action mission execution time so as to reduce the amount of change in the alpha particle concentration value.

5. The radon management system of claim 1, wherein, when collecting the alpha particle concentration value transmitted from each radon detector during the preset measurement period, the radon management server determines the alpha particle concentration value transmitted from each radon detector as noise in a case where the alpha particle concentration value is greater than a preset maximum alpha particle concentration value or less than a preset minimum alpha particle concentration value, uses only the alpha particle concentration value excluding the alpha particle concentration value determined as the noise among the collected alpha particle concentration values, and calculates the average value of the alpha particle concentration values.

6. The radon management system of claim 1, wherein the radon management server converts the user action mission information corresponding to the amount of change in the calculated alpha particle concentration value into the database (DB) for each amount of change in the alpha particle concentration value so as to reduce the amount of change in the alpha particle concentration value and include information of action mission contents and action mission execution time, stores and manages the user action mission information in a separate storage device,
wherein the radon management server extracts the amount of change in the alpha particle concentration value at a time of generating the radon generation event information data, reads, from the storage device, the user action mission information corresponding to the amount of change in the extracted alpha particle concentration value, and determines that the action mission contents included in the read user action mission information has been performed by a user, when the alpha particle concentration value transmitted in real time from each radon detector within the action mission execution time included in the read user action mission information is less than the average value of the alpha particle concentration values previously stored in the storage device.

7. The radon management system of claim 6, wherein, when it is determined that the action mission contents included in the read user action mission information has been performed by the user, the radon management server provides a preset reward on the basis of information on the corresponding user.

8. The radon management system of claim 1, wherein the radon management server collects the unique device identification information together with the alpha particle concentration value transmitted from each radon detector during a preset first measurement period, analyzes the alpha particle concentration values collected during the first measurement period, extracts a first alpha particle concentration pattern, converts the extracted first alpha particle concentration pattern into the database (DB) for each radon detector, and stores and manages the first alpha particle concentration pattern.

9. The radon management system of claim 8, wherein the radon management server collects the unique device identification information along with the alpha particle concentration value transmitted from each radon detector during a preset second measurement period, analyzes the alpha particle concentration values collected during the second measurement period, extracts a second alpha particle concentration pattern, determines that a change has occurred in a periodic action pattern of the corresponding user in a specific place when the second alpha particle concentration pattern does not match the first alpha particle concentration pattern, generates a notification message, and then transmits the generated notification message to a preset external terminal held by the corresponding user.

10. The radon management system of claim 9, wherein the radon management server converts user action recommendation information corresponding to the average value of the alpha particle concentration values collected during the second measurement period into the database (DB) for each average value of the alpha particle concentration values, stores and manages the user action recommendation information in a separate storage device, calculates the average value of the alpha particle concentration values collected during the second measurement period when the second alpha particle concentration pattern does not match the first alpha particle concentration pattern, reads, from the storage device, the user action recommendation information corresponding to the average value of the calculated alpha particle concentration values, and generates the notification message by using the read user action recommendation information.

11. The radon management system of claim 1, further comprising:
a radon reduction facility including at least one discharging fan that suctions air entering a specific space through a vent pipe connected to the specific space, discharges the suctioned air to an external space, and reduces concentration of the alpha particles contained in the suctioned air,
wherein the radon management server collects the unique device identification information together with the alpha particle concentration value transmitted from each radon detector during a preset first measurement period, analyzes the alpha particle concentration values collected during the first measurement period, extracts a first alpha particle concentration pattern, converts the extracted first alpha particle concentration pattern into the database (DB) for each radon detector, stores and manages the first alpha particle concentration pattern, collects the unique device identification information along with the alpha particle concentration value transmitted from each radon detector during a preset second measurement period, analyzes the alpha particle concentration values collected during the second measurement period, extracts a second alpha particle concentration pattern, determines that a change has occurred in a periodic action pattern of the corresponding user in the specific place when the second alpha particle concentration pattern does not match the first alpha particle concentration pattern, and controls an operation of the radon reduction facility.

12. The radon management system of claim 11, wherein the radon management server transfers a request message asking whether a change has occurred in the periodic action pattern of the corresponding user to a preset external terminal held by the corresponding user when it is determined that the change has occurred in the periodic action pattern of the corresponding user in the specific place, and controls each radon reduction facility to operate until a value where the alpha particle concentration value transmitted from each radon detector is less than the alpha particle concentration value obtained before the change in the corresponding user's periodic action pattern occurs is detected when there is no response to the request message during a preset response time from the preset external terminal or when receiving a response notifying that the change has occurred in the user's periodic action pattern.

13. The radon management system of claim 12, wherein the radon management server determines that the radon reduction facility is not operating properly when receiving the response notifying that no change has occurred in the user's periodic action pattern from the preset external terminal, generates a warning message notifying that the radon reduction facility is in an abnormal state, and transmits the warning message to the preset external terminal through the communication network.

14. The radon management system of claim 12, wherein the radon management server determines that the radon reduction facility is not operating properly when the alpha particle concentration value transmitted from each radon detector after the preset radon reduction reference time is unable to become a value which is less than the alpha particle concentration value obtained before the change of the corresponding user's periodic action pattern occurs, determines that the radon reduction facility is not operating properly, generates a warning message notifying that the radon reduction facility is in an abnormal state, and transmits the warning message to the preset external terminal through the communication network.

15. The radon management system of claim 1, wherein the preset measurement period is set as a period of measurement every 10 minutes for an hour, and
the radon management server collects the unique device identification information along with the alpha particle concentration value transmitted from each radon detector during the preset measurement period, learns and analyzes the collected alpha particle concentration values, generates a radon concentration pattern over time, converts the radon concentration pattern into the database (DB) for each radon detector, stores and manages the radon concentration pattern in a separate storage device, generates a push alarm message for notifying a radon concentration risk when the alpha particle concentration value transmitted in real time from each radon detector is greater than a value of the radon concentration pattern previously stored in the storage device or greater than the preset radon concentration risk reference value, and transmits the push alarm message to a preset external terminal through the communication network.

16. The radon management system of claim 15, wherein the push alarm message for notifying the radon concentration risk comprises ventilation time information corresponding to the alpha particle concentration value transmitted from each radon detector.

17. The radon management system of claim 1, wherein the radon management server provides a cloud computing service in response to a request from at least one client terminal, provides a cloud web service so as to download, through each client terminal, radon management-related information data converted into the database (DB) and stored in a separate storage device, encrypts and stores the radon management-related information data by using a symmetrical or asymmetric encryption method in a case of converting the radon management-related information into the database (DB) so as to be stored in the storage device, and provides a service so that a decryption key capable of decrypting the encrypted radon management-related information data is transmitted to each client terminal, and each client terminal searches in real time the radon management-related information data stored in the storage device of the radon management server by using the cloud web service of a client member login of the radon management server, displays the radon management-related information data on a display screen, decrypts the radon management-related information data encrypted and stored in the storage device of the radon management server by using the corresponding client member login information together with the decryption key transmitted from the radon management server, searches in real time and displays the radon management-related information data on the display screen, searches in real time the radon management-related information data stored in the storage device of the radon management server through a radon management-related application downloaded from the radon management server, and displays the radon management-related information data on the display screen.

18. The radon management system of claim 1, wherein, based on the unique device identification information together with the alpha particle concentration value transmitted from each radon detector or the average value of the calculated alpha particle concentration values, the radon management server provides a service for the radon management-related information data to be displayed on a display screen of an administrator or displayed on the user's display screen provided in an external terminal, so that the administrator is able to monitor the radon management-related information data for each radon detector on a daily, day of the week, weekly, monthly, quarterly, and yearly basis, and on the basis of a real-time GIS (Geographic Information System).

* * * * *